(12) United States Patent
Lehr et al.

(10) Patent No.: US 7,429,808 B2
(45) Date of Patent: Sep. 30, 2008

(54) GLIDING FIELD LINEAR MOTOR

(75) Inventors: Heinz Lehr, Berlin (DE); Stephan Schrader, Berlin (DE); Steffen Walter, Berlin (DE)

(73) Assignee: Technische Universitaet Berlin, Berlin (DE)

( * ) Notice: Subject to any disclaimer, the term of this patent is extended or adjusted under 35 U.S.C. 154(b) by 552 days.

(21) Appl. No.: 10/550,599

(22) PCT Filed: Mar. 23, 2004

(86) PCT No.: PCT/EP2004/003086

§ 371 (c)(1),
(2), (4) Date: Nov. 18, 2005

(87) PCT Pub. No.: WO2004/086595

PCT Pub. Date: Oct. 7, 2004

(65) Prior Publication Data

US 2006/0226713 A1 Oct. 12, 2006

(30) Foreign Application Priority Data

Mar. 24, 2003 (DE) ............................... 103 14 133
May 20, 2003 (DE) ............................... 103 23 629

(51) Int. Cl.
    *H02K 41/00* (2006.01)
(52) U.S. Cl. ........................................................ 310/12
(58) Field of Classification Search .................... 310/12
    See application file for complete search history.

(56) References Cited

U.S. PATENT DOCUMENTS

| | | | |
|---|---|---|---|
| 3,663,071 A | 5/1972 | Kates | |
| 5,334,892 A * | 8/1994 | Chitayat | ...................... 310/12 |
| 5,360,445 A * | 11/1994 | Goldowsky | ................. 623/3.22 |
| 5,490,015 A | 2/1996 | Umeyama et al. | |
| 5,543,726 A * | 8/1996 | Boyette et al. | ............... 324/758 |
| 5,691,582 A | 11/1997 | Lucas et al. | |
| 5,896,076 A | 4/1999 | van Namen | |
| 6,184,597 B1 * | 2/2001 | Yamamoto et al. | ............ 310/14 |

(Continued)

FOREIGN PATENT DOCUMENTS

DE    37 82 817 T2    4/1993

(Continued)

*Primary Examiner*—James Harvey
(74) *Attorney, Agent, or Firm*—Rothwell, Figg, Ernst & Manbeck, P.C.

(57) ABSTRACT

The invention relates to a three-phase linear synchronous motor with an armature having an axial bore through the middle, into which the optical element—for example an optical lens—can be installed. The armature comprises a sliding sleeve inside which an axially polarized permanent magnet with an unobstructed center bore is located. The armature is guided inside a stationary outer sheath. The armature is displaced by interaction between the permanent magnet and a magnetic field that is moved along the optical axis. The traveling field is generated by at three adjacent stator coils wound around the outer sheath and each having a separate and variable supply of current. The position of the armature is defined by self-holding forces of the permanent magnet in the magnetic field of the coils. The traveling wave magnetic field and hence the armature can be axially displaced with as much precision as desired. The track of the armature can be made as long as desired by changing the number of coils. The system is suitable for miniaturization of optical systems.

17 Claims, 4 Drawing Sheets

U.S. PATENT DOCUMENTS

Figure 1:
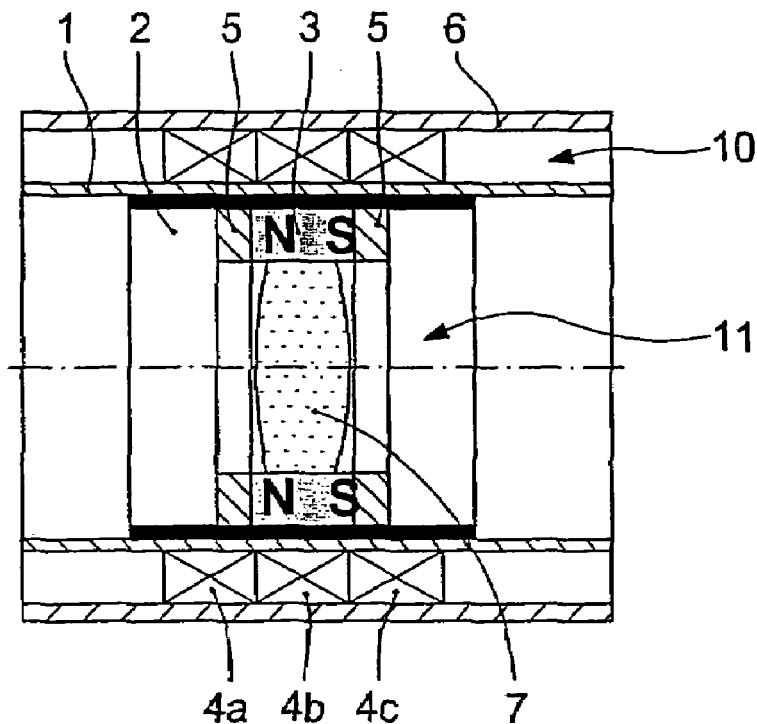

| | | | |
|---|---|---|---|
| 6,313,726 B1 * | 11/2001 | Golovatai-Schmidt et al. | 335/220 |
| 6,822,349 B2 * | 11/2004 | Lunz et al. | 310/12 |
| 6,849,970 B2 * | 2/2005 | Watanabe | 310/12 |
| 7,166,938 B2 * | 1/2007 | Kang et al. | 310/12 |
| 2003/0132672 A1 * | 7/2003 | Watanabe | 310/12 |
| 2004/0021374 A1 * | 2/2004 | Kang et al. | 310/12 |
| 2006/0226713 A1 * | 10/2006 | Lehr et al. | 310/12 |

FOREIGN PATENT DOCUMENTS

| | | |
|---|---|---|
| DE | 196 05 413 A1 | 7/1996 |
| DE | 37 17 872 C2 | 1/1997 |
| DE | 196 18 355 A1 | 11/1997 |
| DE | 196 50 360 A1 | 5/1998 |
| DE | 198 32 244 A1 | 2/2000 |
| DE | 199 27 129 C1 | 1/2001 |
| DE | 43 12 489 C2 | 12/2001 |
| EP | 0 165 584 A | 12/1985 |
| GB | 645281 A | 10/1950 |
| GB | 2 385 967 A | 8/2001 |
| JP | 63031465 A | 2/1988 |
| JP | 2001025229 A | 1/2001 |

* cited by examiner

GLIDING FIELD LINEAR MOTOR

CROSS REFERENCE TO RELATED APPLICATION

This application is a 35 USC § 371 National Phase Entry Application from PCT/EP2004/003086, filed Mar. 23, 2004, and designating the United States.

The invention relates to an electromagnetic linear motor of the traveling field type, comprising a magnetic coil arrangement and a permanent magnet linearly movable with respect to said magnetic coil arrangement. The magnetic coil arrangement comprises at least three magnetic coils (4a, 4b, 4c) configured and disposed to generate a traveling wave magnetic field for moving the permanent magnet with positional precision.

The invention also relates to a drive for optical elements such as lenses, prisms, mirrors, shutters, CCD chips, etc.

Miniaturization, especially of optical systems containing motorically displaceable optical elements (lens, prism, mirror, shutter, CCD chip, etc.), requires the development of special drive technologies.

A number of optical requirements must be met in this context, for example good positionability, a track of any desired length for the optical element being moved, separate displacement of several optical components with different paths of travel, maintaining an unobstructed beam path whatever the position of the optical element, etc.

A piezoelectric actuating drive for moving a focusing lens is known from U.S. Pat. No. 5,490,015, in which a piezoelectric stacked actuator is energized to produce an impulse causing the focusing lens mount connected to the actuator to move for a short time. Longer adjustment paths can be achieved by applying a timed sequence of voltage pulses. However, the one-sided application of force by the actuator and its pulse-like operation causes a longitudinal jerking movement, the amplitude of which is determined very sensitively by local static friction, with the result that the adjustment speed and precision of adjustment are limited. Also annoying are the high voltage pulses necessary to operate the actuator, and which impair the video image, for example. The design of this actuator generally makes it difficult to adjust a plurality of lens groups, hinders the miniaturization of the entire arrangement, and due to the piezoactuator is difficult to use at temperatures above 100° C. (e.g. to sterilize medical instruments at 133° C., or to monitor welding, etc.).

Motor drive systems for controlling a zoom lens are known, for example, from DE 43 12 489 A1. Said drive systems use pinions, gear wheels and helical guides for power transmission from the motor to the zoom lens mount. However, using such elements obviously makes it more difficult to miniaturize optical instruments.

Strip-shaped piezoelectric bending actuators for adjusting a focusing lens are known from DE 199 27 129 C 1. In said patent specification, the strip-shaped bimorphous piezoactuators move when a voltage is applied orthogonally to the direction in which the focusing lens is adjusted. Hinged joints between the focusing lens and the piezo strips allow the focusing lens to move along the optical axis of the lens system. The advantage of having continuous stictionless movement is offset, however, by the disadvantages that the drive system requires much more space, thus increasing the diameter of the drive system, and that it has a limited adjustment range.

Use of a stepped motor to move a zoom lens is likewise known from DE 199 27 129 C 1. However, said motor is not located in the longitudinal axis of the lens system, so the overall diameter is greatly increased.

An electrodynamic drive comprising a permanently magnetic sleeve which slides inside an outer sheath and is moved by Lorentz forces when current is supplied to two solenoids with opposite windings (plunger coil principle) is known from laid-open patent specification DE 196 18 355 A 1. However, there are some disadvantages to this actuator, which is intended for use in endoscopes. When supplying current to the solenoids, the permanent magnet travels to an end position defined by the length of the magnets and the oppositely wound solenoids. Since the actuator does not have a natural rest position and is not self-holding, the positioning of lenses or groups of lenses and the locking of their position, for example when accelerating forces occur, can be effected by a control circuit, which necessitates a position measuring system as described in DE 196 05 413 A 1. A conceivable alternative for positioning the sleeve would be to move it against the force of a spring, but this would then require additional space. Both cases involve a considerable increase in cost and complexity. The path that the magnet is able to travel is constrained by the overall length of the magnet arrangement. If greater paths of travel are desired in a motor based on a moving coil, this can only be achieved by making the magnetic length of the armature appropriately long, and by using solenoid coils that are at least twice as long. Due to the increased axial length of the narrow through bore of the armature, this can lead to obstruction of the optical beam path. Long solenoids also make it difficult to use a plurality of independent optical elements arranged and driven in axial series. The poles of the armature cannot move beyond their associated coils. This renders it wholly impossible to move an armature into the coil system of a different armature, or for different armatures to have overlapping paths. This imposes major limitations on the design of the optical systems.

A linear motor consisting of an armature which has a central hole and can move within a cylindrical stator is known from GB 2 358 967.

The object of the present invention is to provide a drive of the kind initially specified that is as small and simple as possible and which produces high-precision positioning. In the case of a drive for optical elements, the aim is for the positioning of optical elements to be infinitely flexible, and that the entire assembly can be miniaturized to such an extent that diameters of a few millimeters are achieved.

According to the invention, this object is achieved with an electromagnetic traveling field-type linear motor of the kind initially specified, in which the magnetic coils have closed windings of conductive wire wound around a longitudinally extended cavity and the permanently magnet is axially polarized and disposed inside a sliding sleeve and the sliding sleeve is guided with longitudinal movability within the cavity.

At least portions of an outer surface of the sliding sleeve and at least portions of an inside wall of the longitudinally extended hollow member are configured as sliding surfaces and co-operate as a sliding bearing.

In addition to a longitudinally extended cavity in the form of a tube with a circular section and a cylindrical sliding sleeve, other variants of the invention are conceivable in which the sliding surfaces of the hollow member and/or the sliding sleeve are configured in strip-shaped form, for example, and run in the axial direction of the hollow member or sliding sleeve. The cavity or the sliding sleeve can also have a cross-sectional geometry or guide grooves, and matching abutments on the respective other component which engage with the guide groove.

To minimize friction and wear, the sliding surfaces of the longitudinally extended cavity and the sliding sleeve are preferably polished, and they can also be coated with a hard material (such as $Si_3N_4$, SiC or diamond-like carbon (DLC)).

By winding the windings of the magnetic coils completely around the cavity, it is possible to obtain a linear motor of particularly simple and small design. The locally variable magnetic traveling field moves the permanent magnet, which may, for example, be connected to optical elements likewise positioned within the sliding sleeve. This results in a particularly small linear motor for optical elements that is capable of high-precision positioning.

In a preferred variant of the invention, soft magnetic armature pole pieces are disposed at the two far ends of the permanent magnet. In another preferred variant of the invention, a soft magnetic outer tube is also provided that encloses the cavity and in which the windings of conductive wire are accommodated. Each of these separate measures contributes to efficient use of the electromagnetic traveling field generated by the magnetic coil arrangement.

Finally, an axially mobile sliding sleeve guided within the outer sheath is provided, inside which sleeve the permanent magnets are arranged in such a way that they enclose a cavity in which optical elements in the form of lenses, for example, can be disposed.

A particularly preferred variant of the invention comprises a three-phase linear synchronous motor of the kind specified in claim 1, said motor effecting the axial displacement of optical elements along its axis. The structure of the motor allows the optical system to be miniaturized, as well as a high degree of flexibility in the configuration of the optical elements.

Specifically, an electromagnetic linear motor of the traveling field type is provided for moving optical elements within an outer sheath, in which the motor has an axially displaceable sliding sleeve which slides inside the outer sheath and receives at least one axially polarized permanent magnet and optical elements. Also provided is an arrangement comprising at least three coils that are wound around the outer sheath and, by being independently and variably supplied with current, can generate a magnetic traveling field that is intensified and guided in concentrated form by magnetic reflux via a soft magnetic outer tube and soft magnetic armature pole pieces. The three-phase traveling field is used to move the permanent magnet and the sliding sleeve connected thereto in the axial direction. By interacting with the permanent magnet, the traveling field generates self-holding that result in the armature location being locked down and in the optical elements being positionally stabilized by restoring forces.

This arrangement is an electromagnetic linear motor of the traveling field type that can essentially be understood as a three-phase linear synchronous motor. Said motor is used for continuous displacement of single lenses, groups of lenses or other optical elements (e.g., prisms, mirrors, shutters, CCD chips, etc.) and is particularly suitable for miniaturized optical instruments such as endoscopes. Typical tasks performed by the motor are to magnify or scale down an image in an image plane by moving a zoom lens, by moving an image sensor, or by adjusting image sharpness by moving a focusing lens.

For each adjuster element, a thin-walled sliding sleeve slides as an armature inside a stationary outer sheath, with an axially polarized permanent magnet with an unobstructed center through hole being located inside the sliding sleeve. The sliding sleeve serves to receive and center the permanent magnet and the optical elements. It is moved by interaction of the permanent magnet with a magnetic traveling field directed along the optical axis, said traveling field being produced by at least three stationary coils lying adjacent each other and wound around the outer sheath, and supplied separately and variably with current. The position of the armature is defined by self-holding forces of the permanent magnet in the magnetic field of the coils, with the result that no position measuring system is required. Self-holding is advantageous, especially when the optical elements are adjusted to fixed positions, because it prevents incorrect adjustment of the lenses due to jerky movements of the instrument, or to the force of gravity. High-precision positioning can also be achieved, because the influence of static friction can be reduced at will by briefly increasing the strength of the current. Owing to the coil arrangement and the resultant magnetic field, the longitudinal dimensions of the permanent magnet are so small that there is hardly any obstruction of the optical beam path.

In a preferred variant of the invention, additional groups of three adjacently mounted coils allow the path of travel of the permanent magnet to be extended at will, in contrast to the plunger coil principle. No lengthening of the permanent magnet is required whatsoever, thus maintaining every degree of freedom in designing optical systems, and making it possible, in particular, to independently move different lenses or groups of lenses in an optical system by using a plurality of actuators.

Optical instruments such as endoscopes, or video cameras for microassembly and monitoring, must have as small a diameter as possible. The aim must therefore be to miniaturize the entire optical system, including the actuators for lens adjustment. This is achieved by means of the field-guided, permanent magnet linear motor according to the invention. The linear motor can be space-saving in design and only a few millimeters in diameter, with positioning accuracy in the micron range.

The invention shall now be described in greater detail with reference to drawings and the embodiments shown therein. The drawings show:

FIG. 1: a sectional drawing of the three-phase linear synchronous motor.

Figure 2:
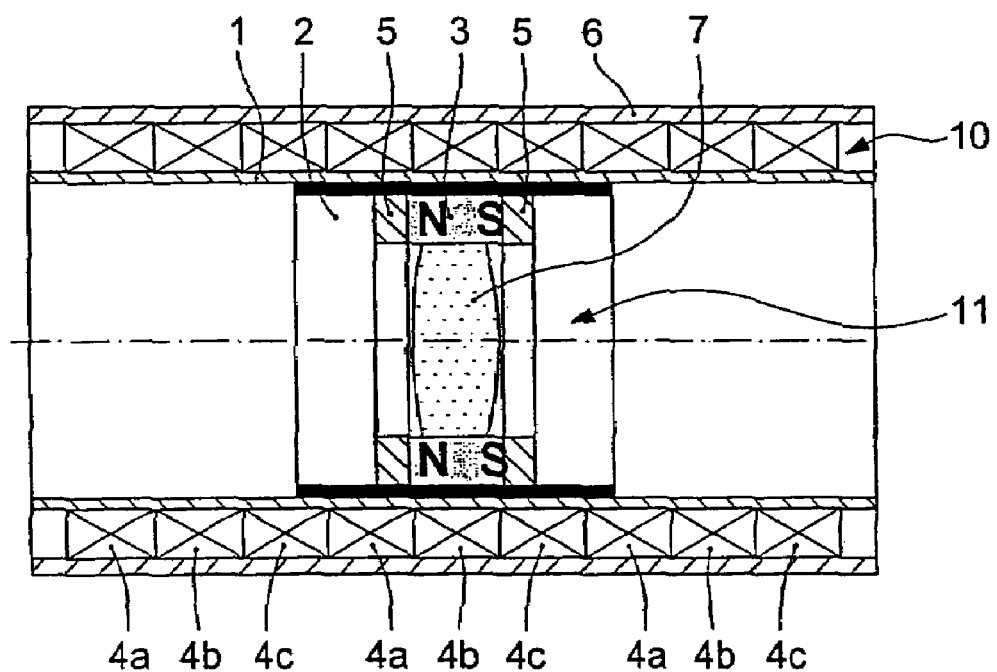

FIG. 2: a linear drive as shown in FIG. 1, but with three coil systems each having three coils (4*a,b,c*) for lengthening the travel path.

Figure 3:
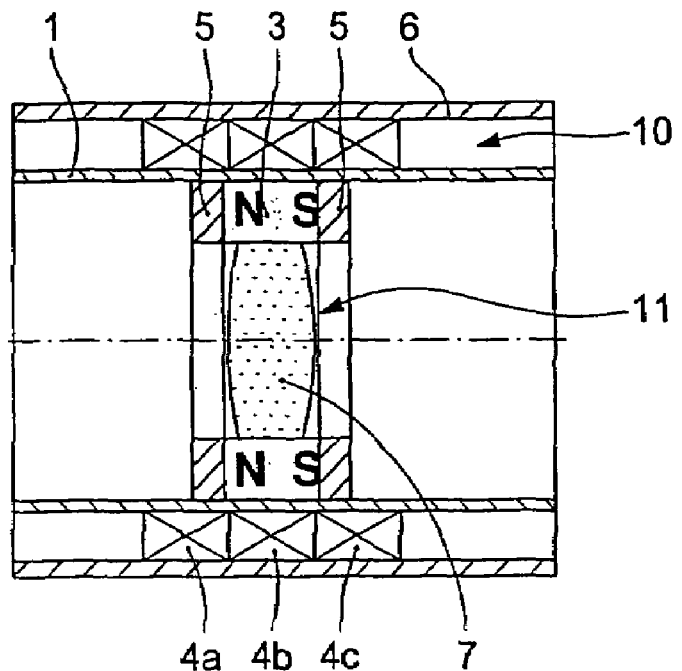

FIG. 3: a linear drive as shown in FIG. 1, but with a three-pole armature (11).

Figure 4:
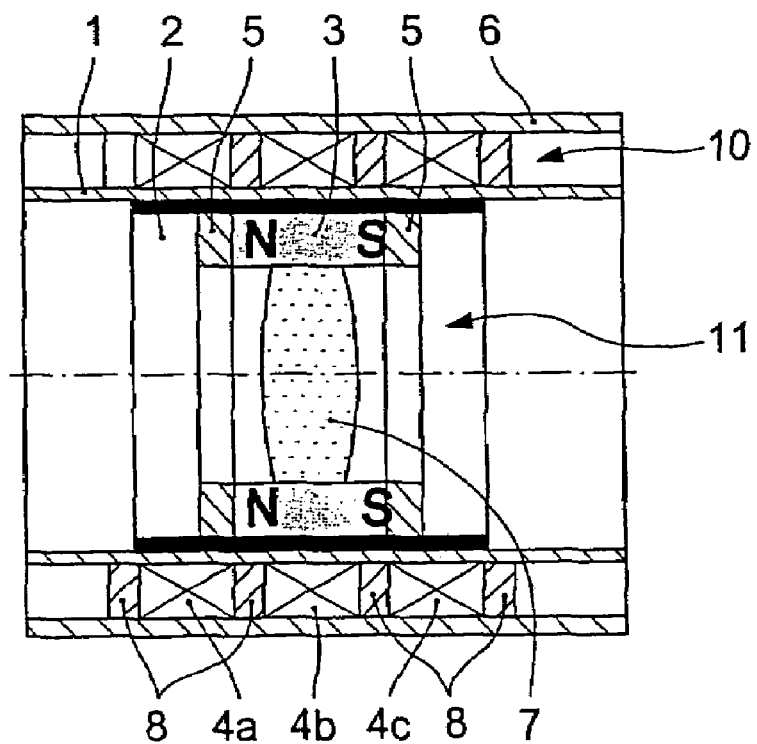

FIG. 4: a linear drive as shown in FIG. 1, but without a sliding sleeve (2).

Figure 5:
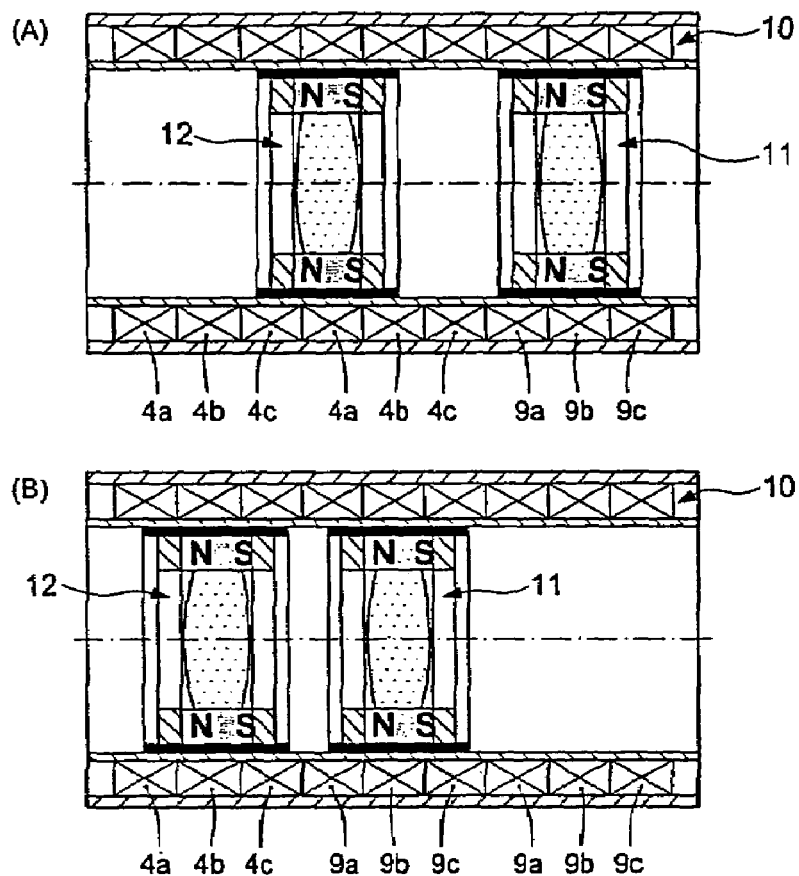

FIG. 5: a linear drive as shown in FIG. 1, but with soft-magnetic stator pole pieces (8) between the coils (4) for guiding the magnetic flux.

Figure 6:
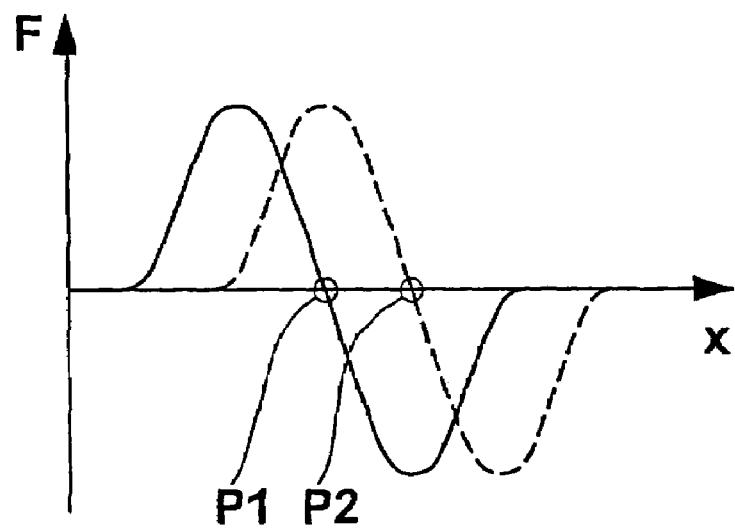

FIG. 6: two separately controllable armatures (11 and 12) with overlapping paths of travel within a coil system.

Figure 7:
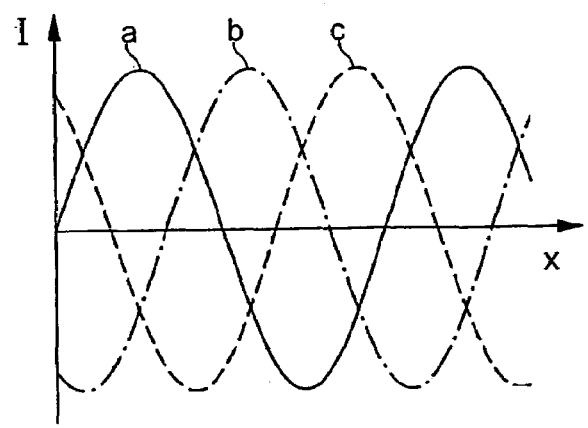

FIG. 7: the axial profile of the resultant axial force (F) as a function of the path (x) for two different phase controls.

Figure 8:
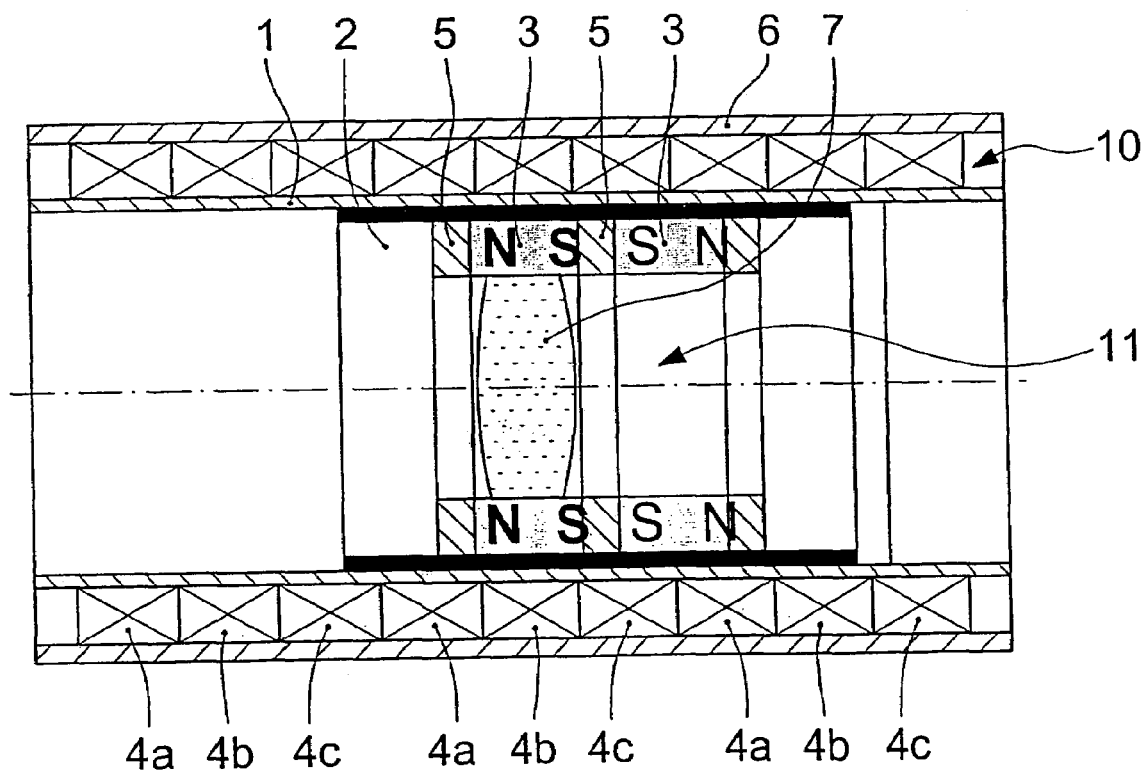

FIG. 8: how the current supply (I) to the three coils (a, b, c) varies according to position (x).

FIG. 1 shows, in the form of a sectional drawing, the basic structure of the three-phase linear synchronous motor pursuant to claim 1. The drawing shows a stationary stator (10) comprised of an outer sheath (1), three coils (4*a, b, c*) wound around the outer sheath, and an outer tube (6). The function of the outer sheath (1) of the stator (10) is to guide the axially displaceable armature (11) comprised of a sliding sleeve (2) and, mounted inside said sleeve, an axially magnetized permanent magnet (3) with an unobstructed center through hole. In the embodiment shown, an optical element such as a lens (7) is embedded in said passage (7).

A magnetic field that causes the armature (11) to be moved and positioned is produced by superimposing the magnetic fields of the permanent magnet (3) and of the current-bearing coils (4a, b, c), which can each be supplied with current variably and independently of each other, yet always in a predefined relationship to each other (FIG. 8). The magnetic flux is guided by the armature pole pieces (5) attached to the permanent magnet, and by the outer tube (6), both of which are made of soft magnetic materials.

For miniaturization purposes, the magnet (3) is preferably manufactured of permanently magnetic materials with very high energy densities, for example neodymium-iron-boron or samarium-cobalt. The outer sheath (1) and the sliding sleeve (2) serve only to guide the armature (11) inside the stator (10), and should have no influence on the magnetic field. They are therefore made of a non-ferromagnetic material such as chrome-nickel-steel or copper-beryllium. In order to minimize friction and wear and tear, the sliding surfaces (also referred to as bearing surfaces) of the outer sheath (1) and the sliding sleeve (2) are polished and may be coated additionally with a hard material (such as $Si_3N_4$, SiC or diamond-like carbon (DLC)). The structure shown can be modified to obtain the following variants, which may also be combined with each other:

(I) FIG. 2 shows the linear drive of FIG. 1, but with three coil systems each containing three coils (4a, b, c), and with each fourth coil having the same current. The distance over which the armature (11) is actively moved is trebled in comparison with FIG. 1. It is possible by this means to extend infinitely the active travel path according to claim 2, without necessitating axial lengthening of the armature (11) as well. The armature (11) can be moved through all the coil systems continuously and with constant axial driving force.

(II) FIG. 3 shows a linear motor of the aforesaid kind, in which two permanent magnets of the armature are arranged with opposing polarities. This has the advantage that additional coils (when the number of coils is greater than three) are permeated by magnetic flux and generate an additional Lorentz force. The result is an increase in maximum driving force and stiffness of the motor at the same electrical power rating. The armature can basically have any number of poles (>=2).

(III) FIG. 4 shows the linear drive as in FIG. 1, but without a sliding sleeve (2). Radial space is gained by dispensing with this component. In such a case, the outer surfaces of the pole pieces, the permanent magnet or both components serve as bearing or sliding surfaces, which may be coated with hard material to minimize friction and wear and tear.

(IV) FIG. 5 shows the linear drive as in FIG. 1, but with annular, soft-magnetic stator pole pieces (8) disposed between the coils (4) in order to guide the magnetic flux. Pursuant to claim 10, this results in greater adjusting forces compared to the air coil arrangement (FIG. 1). However, the axial force depends on position and, depending on the design and dimensions, can result in a latching force that is more or less pronounced.

(V) FIG. 6 shows an example of how two armatures (11 and 12) with overlapping travel paths can be moved separately from each other in accordance with claim 3. The stator (10) corresponds to that in FIG. 2, and the two armatures (11 and 12) correspond to those in FIG. 1. In the upper part (A) of FIG. 5, armature (11) is moved by two coil systems (4), while a coil system (9) supplied separately with current causes armature (12) to move. If the middle group of three coils is now connected to the system (9) (lower part B of FIG. 5), armature (12) can now be moved into the area in which armature (11) was previously moved by means of coil system (4). Armature (11) should be moved out of the middle coil system before the current supplied to the middle set of three coils is reversed, because otherwise it—and armature (12)—will both be affected by coil system (9).

FIG. 7 shows the profile of the resultant axial force (F) in a linear motor of the air coil type (pursuant to FIGS. 1-4) as a function of the path (x) (broken line). The point at which the axial force crosses zero (P1) defines the respective nominal position of the permanent magnet (3) and hence of the sliding sleeve (2). The gradient at this position results in restoring forces. An increase in current amplitudes produces a higher gradient and stronger restoring forces. The zero crossover point of the broken line (P2) shows a new nominal position when the traveling field continues moving due to the current amplitudes in the coils (4) changing relative to each other. The nominal position can be defined as precisely as desired.

FIG. 8 shows how the current supply (I) to the three coils (a, b, c) varies according to phase angle or position (x). The currents in a three-phase rotating field have a phase angle shift of 120° to each other. Supplying current—while maintaining said phase relationship—produces a magnetic field, the local distribution of which within the stator (10) is dependent on the absolute phase angle (corresponding to the x-axis) of the three currents. Since the absolute phase angle of the currents can be selected with any desired degree of precision, the position of the magnetic field and hence the position of the armature (x) can also be predefined with any desired precision.

The invention claimed is:

1. Electromagnetic linear motor of the traveling field type, with a magnetic coil arrangement (4) and a permanent magnet (3) linearly movable relative to said magnetic coil arrangement (4), the magnetic coil arrangement (4) comprising at least three magnetic coils (4a, 4b, 4c) configured and disposed to generate a traveling wave magnetic field for moving the permanent magnet (3) with positional precision, the magnetic coils (4a, 4b, 4c) comprising closed windings of conductive wire around a longitudinally extended cavity and the permanent magnet (3) being axially polarized and guided longitudinally displaceably inside the cavity, characterized by a sliding sleeve (2) guided axially displaceably inside the outer sheath (1) and enclosing an interior space in which the permanent magnet (3) is disposed, wherein an outer surface of the sliding sleeve (2) and at least one portion of the inner wall surface of the outer sheath form sliding surfaces that co-operate as a sliding bearing.

2. Electromagnetic linear motor according to claim 1, characterized in that the sliding surfaces of the sliding sleeve (2) or the outer sheath (3) or both are covered with layers of hard material such as $Si_3N_4$, SiC or DLC (diamond-like carbon) in order to reduce friction and wear.

3. Electromagnetic linear motor according to claim 1, characterized in that soft magnetic armature pole pieces (5) are mounted on the permanent magnets (3) to guide the magnetic flux.

4. Linear motor according to claim 3, characterized in that the soft magnetic armature pole pieces (5) are disposed at the two far ends of the permanent magnet (3).

5. Linear motor according to claim 1, characterized by a non-ferromagnetic outer sheath (1) which encloses the cavity and around which the windings of conductive wire are wound.

6. Linear motor according to claim 1, characterized by a soft magnetic outer tube (6) enclosing the magnetic coil arrangement (4).

7. Electromagnetic linear motor according to claim 1, characterized in that the axially magnetized permanent magnet (3) is of any geometric shape with an axial bore for an optical beam path.

8. Electromagnetic linear motor according to claim 1, characterized in that the axially magnetized permanent magnet (3) is annular in shape.

9. Electromagnetic linear motor according to claim 1, characterized in that soft magnetic stator pole pieces (8) are mounted between the separate coils (4) to increase the resultant axial force.

10. Electromagnetic linear motor according to claim 1, characterized in that a plurality of armatures (11) of identical design are disposed in a common outer sheath (1) and can be individually moved by separately supplying current to different axially offset groups of triple coils.

11. Electromagnetic linear motor according to claim 10, characterized in that the paths of travel of the different armatures (11) are superimposed by reversing the current supplied to the coils.

12. Electromagnetic linear motor for moving optical elements inside an outer sheath (1), characterized in that the motor has an axially movable sliding sleeve (2) that is guided slidingly inside an outer sheath (1) and forms an armature (11) with at least one axially polarized permanent magnet (3) disposed inside the sliding sleeve, the motor also having an arrangement of at least three coils (4) that are wound around the outer sheath (1) and by being supplied independently and variably with current can generate a magnetic field that is concentrically guided and intensified by magnetic reflux via the soft magnetic outer tube (6) and the soft magnetic armature pole pieces (5), the three-phase traveling field producing the axial movement of the permanent magnet (3) and hence of the sliding sleeve (2), and by interaction with the permanent magnet (3) generates self-holding forces that lead to the location of the armature being fixed and to the position of the optical elements (7) being stabilized by restoring forces.

13. Electromagnetic linear motor according to claim 12, characterized by additional groups of triple coils (4a,b,c) being arranged in sequence on the outer sheath (1) such that the path of travel of the armature (11) is extended without the axial length of the armature (11) having to be modified.

14. Electromagnetic linear motor according to claim 12, characterized in that the armature consists of a plurality of segments of axially magnetized permanent magnets each with a polarity that is opposite that of the adjacent magnet.

15. Electromagnetic linear motor according to claim 12, characterized by at least one optical element being mounted on the armature (11).

16. Electromagnetic linear motor according to claim 15, characterized in that the optical element is disposed inside the sliding sleeve (2).

17. Electromagnetic linear motor according to claim 1, characterized in that the linear motor is designed for exposure to a temperature of at least 133° C. for several hours for sterilization purposes, without detriment to its operation.

* * * * *